(12) United States Patent
Shen (10) Patent No.: US 7,817,336 B2
(45) Date of Patent: Oct. 19, 2010

(54) TELESCOPIC TUBE

(76) Inventor: Dar Tson Shen, 1568 Errigal Place, West Vancouer, BC (CA) V7S 3H1

( * ) Notice: Subject to any disclaimer, the term of this patent is extended or adjusted under 35 U.S.C. 154(b) by 28 days.

(21) Appl. No.: 12/115,683

(22) Filed: May 6, 2008

(65) Prior Publication Data

US 2009/0135478 A1  May 28, 2009

(30) Foreign Application Priority Data

Nov. 27, 2007  (TW) .............................. 96144920 A (51) Int. Cl.
*G02B 23/00* (2006.01)
(52) U.S. Cl. ...................................................... 359/399
(58) Field of Classification Search ................ 359/399, 359/405, 406
See application file for complete search history.

(56) References Cited

U.S. PATENT DOCUMENTS

| 5,130,853 | A | * | 7/1992 | Sakurai | 359/803 |
| 5,192,011 | A | * | 3/1993 | Fuchs | 225/97 |
| 5,224,271 | A | * | 7/1993 | Langford et al. | 33/293 |
| 6,061,175 | A | * | 5/2000 | Watters | 359/366 |
| 6,400,503 | B1 | * | 6/2002 | Mickelson | 359/405 |
| 2002/0039228 | A1 | * | 4/2002 | Watters | 359/399 |

FOREIGN PATENT DOCUMENTS

GB  2217471 A  * 10/1989

\* cited by examiner

*Primary Examiner*—Lee Fineman
(74) *Attorney, Agent, or Firm*—Oyen, Wiggs, Green & Mutala LLP (57) ABSTRACT

A telescopic tube includes an upper section tube and a lower section tube that are provided coaxially with each other. A plurality of connecting rods is provided between the upper and lower section tubes in parallel to the axis of the tube. Via the connecting rods, the upper section tube or the lower section tube can slide telescopically in the axial direction of the tube, thereby extending or retracting the tube.

38 Claims, 6 Drawing Sheets

TELESCOPIC TUBE

BACKGROUND OF THE INVENTION

1. Field of the Invention

The present invention relates to a field of telescope components, and in particular to a telescopic tube that can be used in a Newtonian reflector.

2. Description of Prior Art

A reflector is one of the three major astronomical telescopes. The reflector utilizes lenses and reflecting mirrors to condense the light, thereby forming an image. The light passes thorough a major condensing reflecting mirror and is sequentially reflected to a second reflecting mirror and an eyepiece. In this way, an observer can utilize the eyepiece to observe a target. The Newtonian reflector is one that is commonly used for an astronomical telescope. It utilizes a reflecting mirror having a concave or spherical surface to condense the light that passes through the lens. Thereafter, the condensed light is reflected to a planar reflecting mirror located at the front end of the tube. Then, the planar reflecting mirror reflects the light into the eyepiece outside the telescope, so that the observer can observe the target. Since the cost of the reflecting mirror used in the reflector is much lesser than that of a lens, and the whole structure of the reflector is simple, it is very suitable to observe some dimmer galaxies or nebulas outside the Galaxy. Sometimes, it is feasible to use this kind of telescope to observe the moon or other planets. Further, the Newtonian reflector, especially the Dobsonians reflector supported by a simple bracket, is very popular for the astronomical observers.

Figure 1:
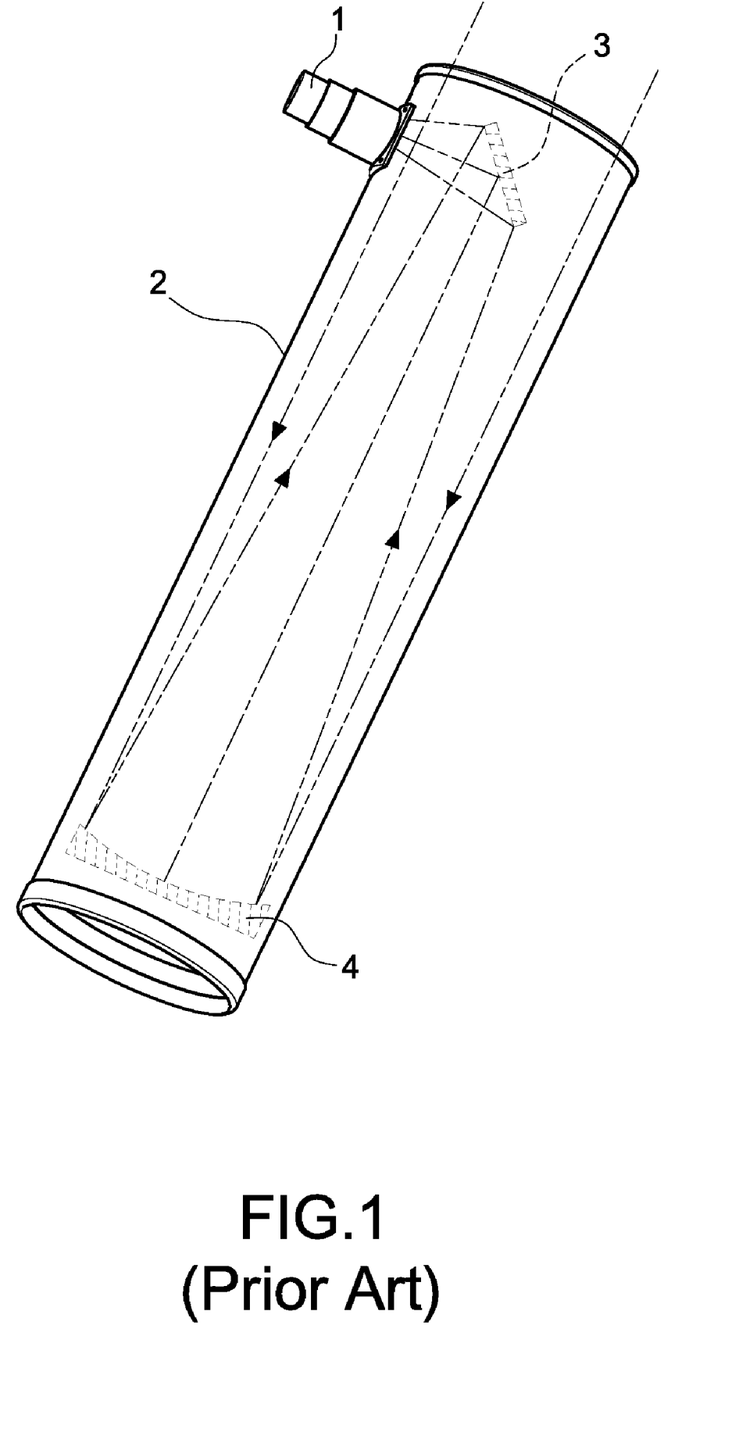
FIG. 1 is a schematic view showing the structure and principle of a conventional Newtonian reflector.

As shown in FIG. 1, the main body of the current Newtonian reflector is constituted of a tube 2, an object lens 4, a reflecting mirror 3 and an eyepiece 1. The bottom end inside the tube is provided with a glass-made object lens having a spherical or parabolic surface coated with a reflective material, which reflects and condenses the parallel lights entering the tube to a point. Then, via the reflecting mirror located on an upper end inside the tube and fixed in front of the focus, which is a small planar mirror, the reflected light from the object lens can be reflected at a right angle into the eyepiece provided on an edge outside the tube, thereby magnifying the image to obtain a picture like that available in a common telescope. The tube is used as a support for each major part in a light path, and in particular, is used to support an object lens of a large weight and a mount for the object lens. Therefore, the tube must have sufficient strength, and is often made from a metal or plastic material that has a high strength and low degree of deformation. The inner diameter of the tube is larger than that of the object lens by 2-3 mm, thereby facilitating the installation and adjustment of the object lens. In general, the length of the tube is at least identical to the focus distance of the objective lens. If the length of the tube is too short, the focus of the major lens may extend beyond the tube by a long distance. Unless the size of a secondary mirror is large enough, some light may lose at the edge of the visual field when the observer chooses a wide-angle eyepiece. In comparison with a reflecting tube, the length of the tube of the Newtonian reflector is only eight times of the diameter of the object lens, which is approximately one half of the reflecting tube. However, for a reflector having a larger diameter of object lens, the length of the tube is still too large. The larger the diameter of the telescope is, the larger the ability of condensing is. As a result, the number of the objects that can be observed is larger. Further, the larger the diameter of the object lens is, the higher the resolution is. Therefore, in order to increase the ability of condensing, the only way is to increase the diameter of the telescope, which in turn has to increase the length of the tube of the telescope. The length of the tube of the current middle-sized Newtonian reflector even achieves 1.0 to 2.0 m. In addition, the brackets for mounting the lens and mirrors also increase the whole weight and volume greatly, which increases the difficulty in transferring the telescope and the accommodating space for the observer. When the observer intends to transfer the telescope to a desired location, such a huge telescope cannot be disposed in a common car. Further, the large weight of the tube also hinders the transferring operation.

Therefore, in view of the above drawbacks of prior art, the inventor of the present invention has proposed a novel and inventive structure based on his expert experience and researches.

SUMMARY OF THE INVENTION

The present invention is to provide a telescopic tube with a reasonable structure, reduced weight, adjustable length and easy operation. Further, it can solve the problem existed in the current Newtonian reflector that the volume and weight of the tube are too large after the condensing ability and the resolution of the reflector are increased. Therefore, the present invention not only can allow the Newtonian reflector to satisfy high condensing ability and resolution, but also can reduce the volume and weight thereof, thereby facilitating the storage and transferring operation.

The present invention is to provide a telescopic tube including an upper section; a lower section tube provided coaxially with the upper section tube; and a plurality of connecting rods connected between the upper and lower section tubes and in parallel to the axis of the tube. Via the above arrangement, the upper and lower section tubes can slide telescopically on the connecting rods in the axial direction of the tube, thereby obtaining a telescopic tube.

Specifically, the upper section tube is fixed to one end of the connecting rod, and the lower section tube is provided thereon with sliding sleeves for allowing the connecting rods to pass through respectively. The other end of the connecting rod penetrates into the sliding sleeve and slides in the sliding sleeve in the axial direction of the tube.

The sliding sleeve is provided thereon with a locking means. The locking means is a bolt that penetrates through a screw hole provided on the sliding sleeve and mates with the screw hole. One end of the bolt abuts against the connecting rod in the sliding sleeve, and the other end thereof is provided with a handgrip.

The sliding sleeve is provided thereon with an elastic positioning pin. An elastic telescopic head of the elastic positioning pin extends into the sliding sleeve and is slidably connected to the connecting rod. The connecting rod is provided thereon with positioning troughs for mating with the elastic telescopic head. When the connecting rod extends to a certain position, the elastic telescopic head is inserted into one of the positioning troughs to position the connecting rod.

A lower outer wall of the upper section tube is provided with an upper fixing sleeve. The upper fixing sleeve is fixed to one end of the connecting rod. An upper outer wall of the lower section tube is provided with a lower fixing sleeve. The lower fixing sleeve is provided thereon with a sliding sleeve for allowing the connecting rod to pass through. After penetrating trough the sliding sleeve, the end of the connecting rod is provided with a stopping block, thereby preventing the connecting rod from being drawn out of the sliding sleeve. The cross section of the connecting rod has a circular, oval or semi-circular shape.

The number of the connecting rods is 3 to 5. Each connecting rod is distributed on the outer wall of the tube uniformly or symmetrically. The length of the connecting rod is identical to or smaller than that of the lower section tube. The length of the lower section tube is larger than that of the upper section tube.

The upper section tube and the lower section tube are provided thereon with connecting surfaces that are mated with each other. After the upper section tube and the lower section tube are slidably connected to each other along the axis, the connecting surfaces are sealed tightly.

The outside of the upper section tube is provided with an eyepiece. The upper section tube is provided therein with a reflecting mirror.

The lower section tube is mounted on a support. The bottom inside the lower section tube is provided with an objective lens.

The length of the upper section tube is larger than that of the lower section tube. One end of the connecting rod is fixed outside the wall of the lower section tube, and the other end thereof penetrates into a sliding sleeve provided outside the wall of the upper section tube. The upper section tube can slide telescopically along the connecting rod. The length of the connecting rod is smaller than or identical to that of the upper section tube.

DETAILED DESCRIPTION OF THE INVENTION

In order to make the Examiner to further understand the characteristics and technical contents of the present invention, a detailed description related thereto will be explained with reference to the accompanying drawings. However, the drawings are illustrative only and are not used to limit the scope of the present invention.

Figure 2:
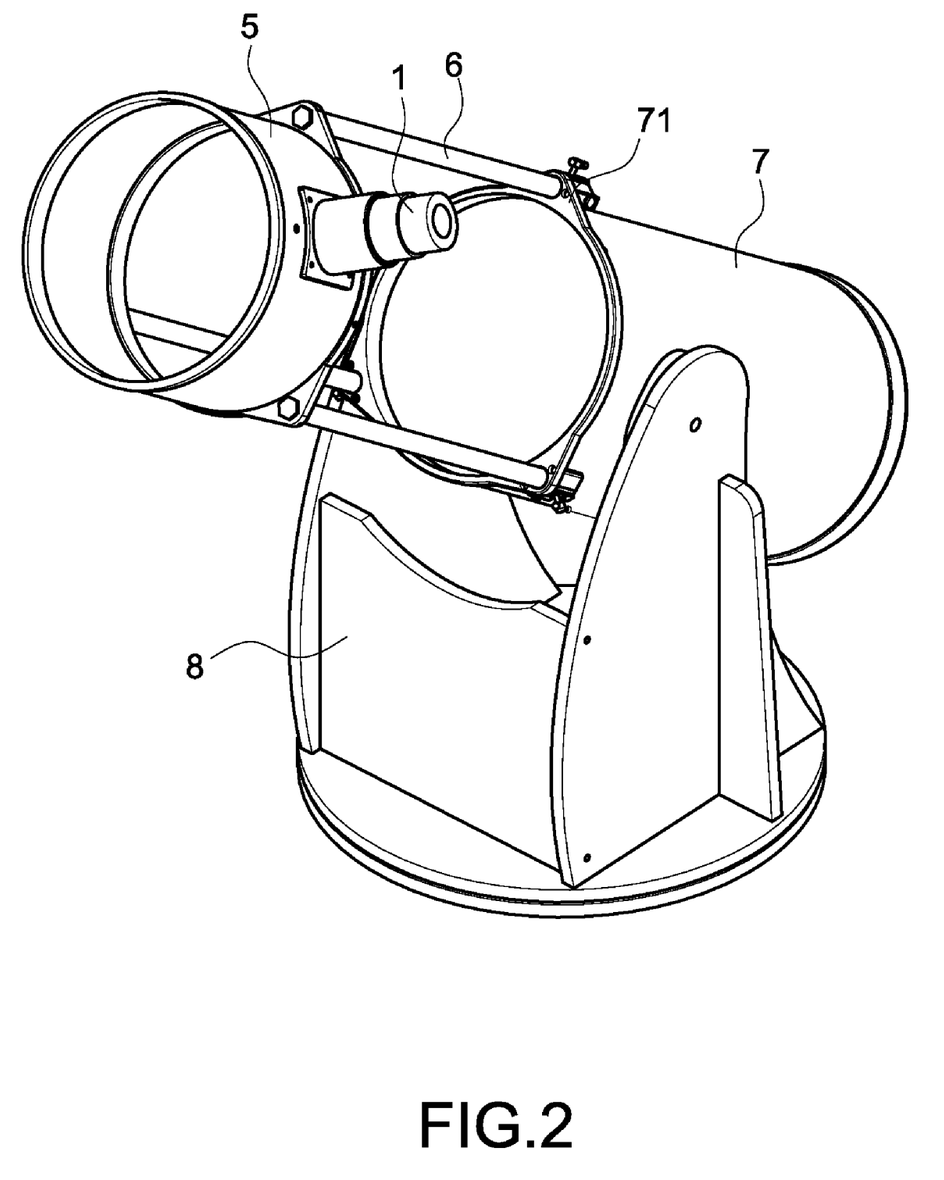
FIG. 2 is a perspective view showing the structure of an embodiment of the present invention.
Figure 3:
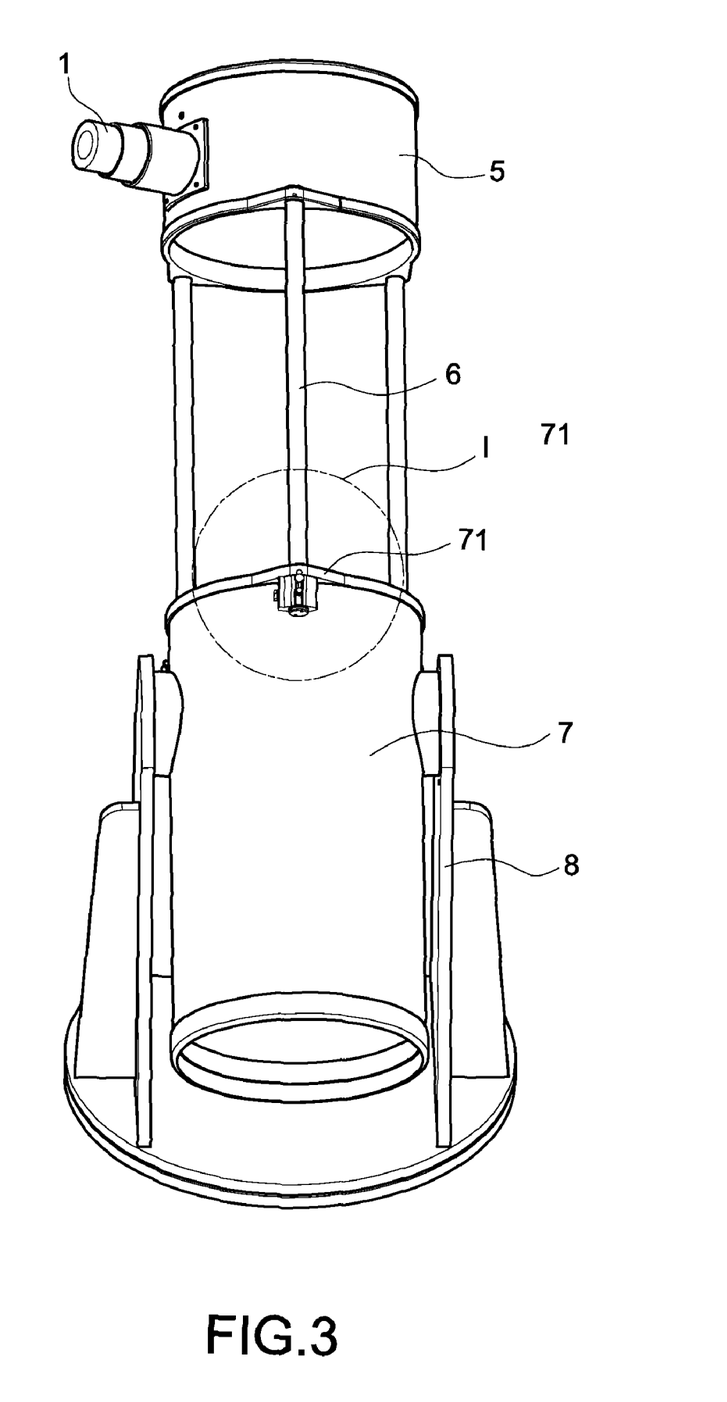
FIG. 3 is a perspective view showing another structure of the embodiment of the present invention.

As shown in FIGS. 2 and 3, the present invention provides a telescopic tube, which is constituted of an upper section tube 5, a plurality of connecting rods 6, a lower section tube 7 and a support 8. The outside of the upper section tube 5 is fixedly provided with an eyepiece 1. The interior of the upper section tube 5 is used to mount a planar reflecting mirror. The lower section tube 7 is mounted on the support 8 and can rotate with respect to the axis of the support. The bottom inside the lower section tube 7 is used to fix an objective lens. The upper section tube 5 and the lower section tube 7 are provided coaxially with each other. The length of the upper section tube 5 is approximately one third of the length of the lower section tube 7. The length of the connecting rod 6 is slightly smaller than that of the lower section tube 7. A lower outer wall of the upper section tube 5 is provided with three upper ends of the connecting rods 6 uniformly. The connecting rods 6 are provided in parallel to the axis of the tube. An upper outer wall of the lower section tube 7 is provided with three sliding sleeves 71 uniformly for allowing the connecting rods 6 to pass through. After the connecting rods 6 penetrate through the sliding sleeves 71 respectively, the distal end of each connecting rod 6 is provided with a stopping block to prevent the connecting rod from being drawn out of the sliding sleeve 71. Via the sliding sleeves 71, the upper section tube 5 together with the connecting rods 6 can slide telescopically in the axial direction of the tube.

Figure 4:
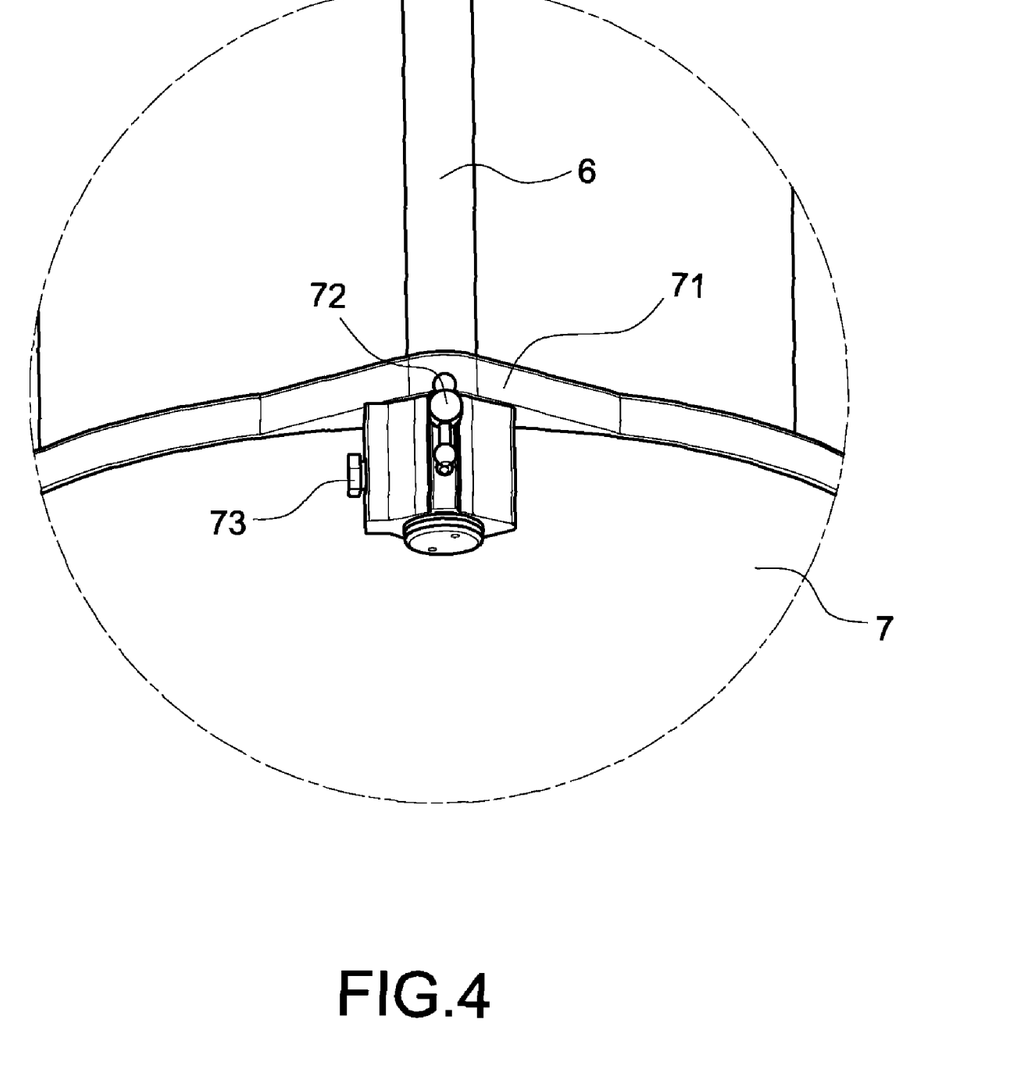
FIG. 4 is an enlarged view showing the details of the portion I in FIG. 3.

As shown in FIG. 4, the sliding sleeve 71 is provided thereon with a locking means 72. The main body of the locking means 72 is a bolt. The bolt is disposed in a screw hole provided on the sliding sleeve 71. One end of the bolt abuts against the connecting rod 6 within the sliding sleeve 71 during the advancing stage, thereby producing a fixing effect to the connecting rod 6. The other end of the bolt is provided with a handgrip for loosening or tightening the bolt. One side of the sliding sleeve 71 is further provided with an elastic positioning pin 73. An elastic telescopic head of the elastic positioning head 73 extends into the sliding sleeve 71 to slidably connect to the connecting rod 6. The connecting rod 6 is provided thereon with positioning troughs for mating with the elastic telescopic head. When the connecting rod 6 extends to a certain length, the elastic telescopic head can be inserted into one of the positioning troughs to position the connecting rod 6. Therefore, in observation, an observer can loosen the bolt of the locking means 72, so that the three connecting rods 6 slide freely through the sliding sleeves 71 respectively. Then, the observe draws the upper section tube 5 in the axial direction of the tube, so that the upper section tube 5 and the connecting rods 6 can move collectively away from the lower section tube 7. When the connecting rods 6 extend to a preset length, the elastic telescopic head 73 of each elastic positioning pin is inserted into the positioning trough on the connecting rod 6, thereby restricting the connecting rod 6 preliminarily. Then, the bolt 6 of the locking means 72 is tightened to fix the connecting rod 6 and the sliding sleeve 71. At this time, the observer can adjust the angle of the tube so as to observe normally.

Figure 5:
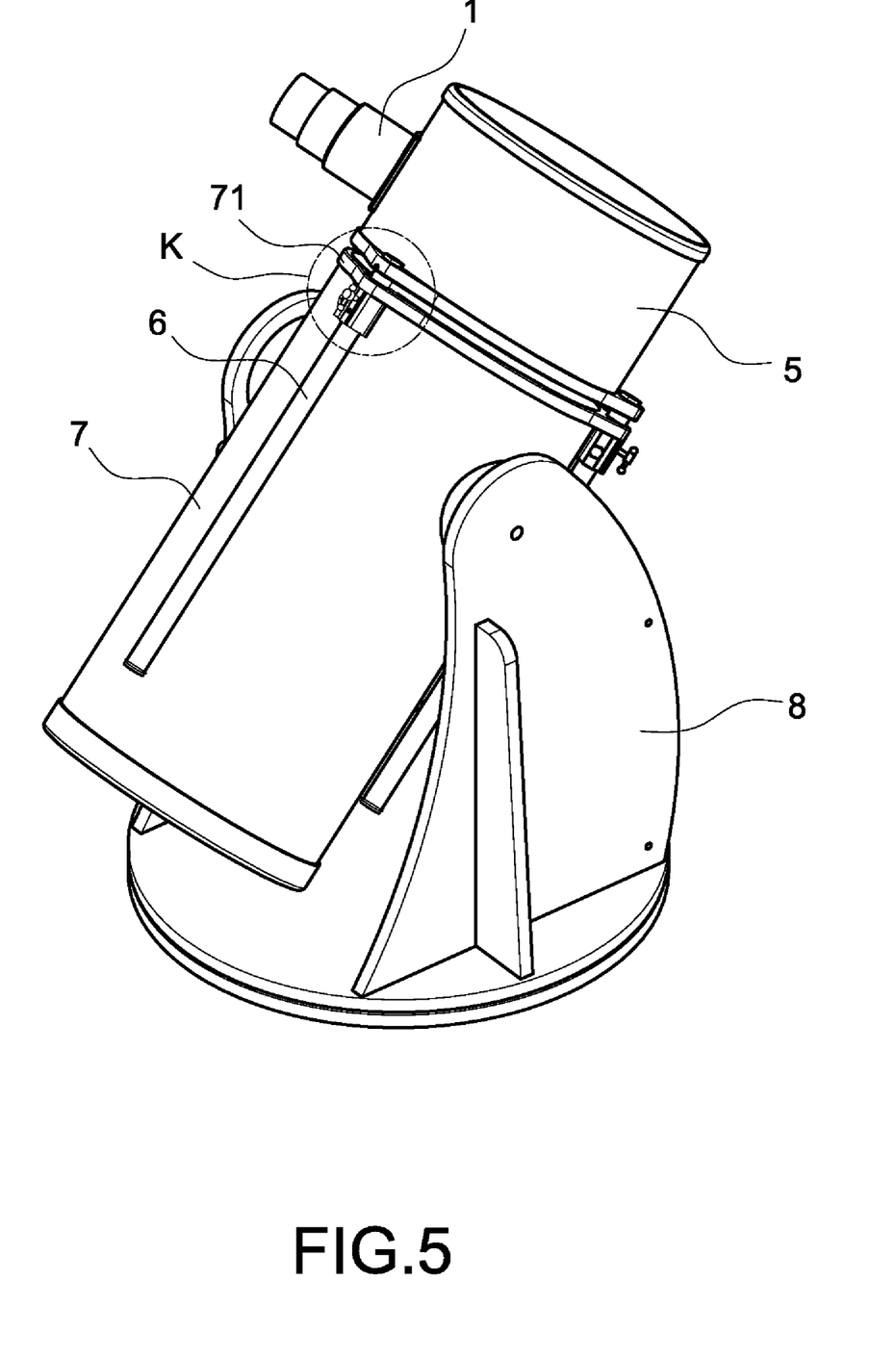
FIG. 5 is another perspective view showing the structure of the present invention.
Figure 6:
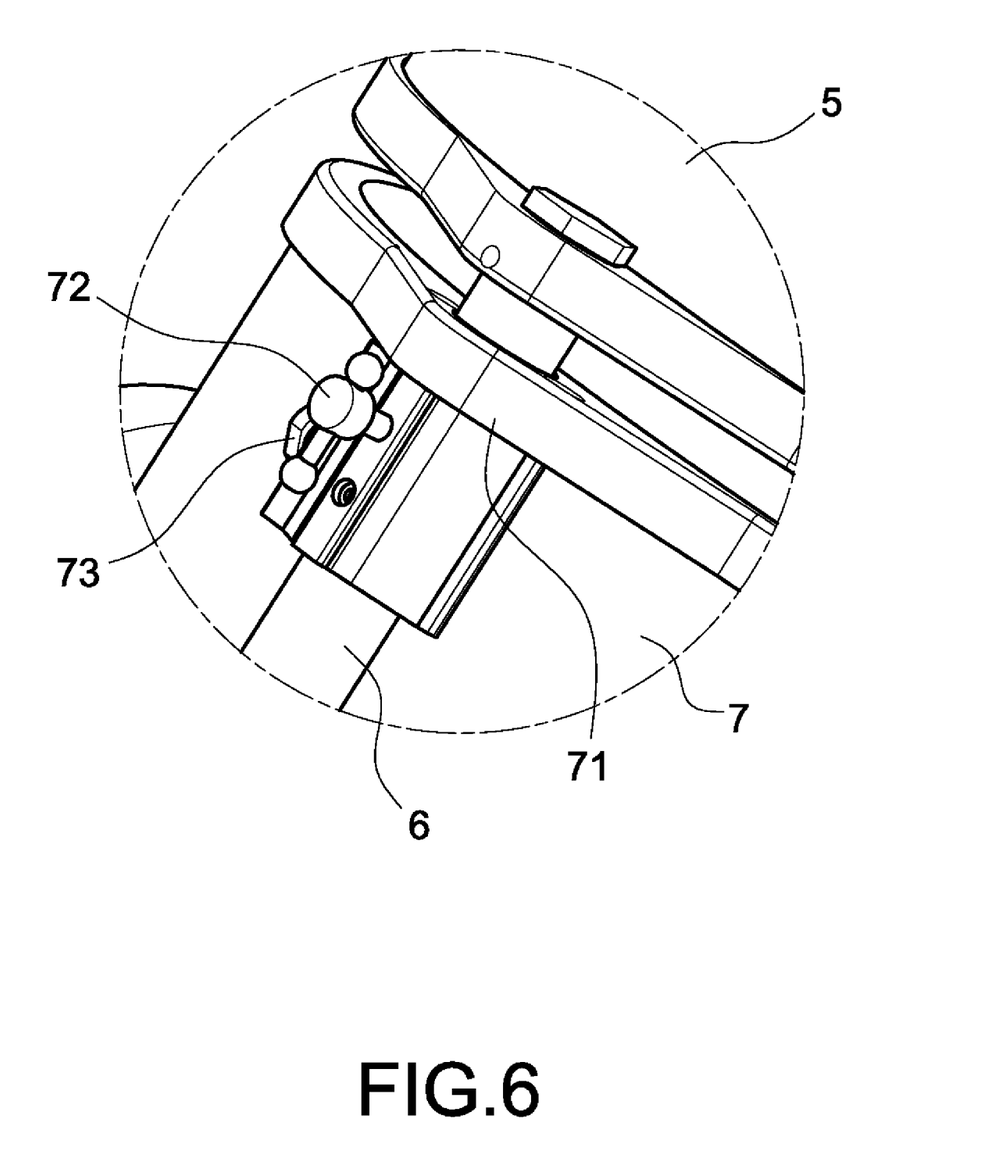
FIG. 6 is an enlarged view showing the details of the portion K in FIG. 5.

As shown in FIGS. 5 and 6, when the observation or use is completed, the observer loosens the bolts of the locking means 72, so that the three connecting rods 6 can slide freely through the sliding sleeves 71. Then, the observer pushes the upper section tube 5 in the axial direction of the tube, so that the upper section tube 5 and the connecting rods 6 moves collectively toward the lower section tube 7. The lower end surface of the upper section tube 5 and the upper end surface of the lower section tube 7 can be connected with each other tightly. At this time, the observer tightens the bolts of the locking means 72 to lock the connecting rods 6 with respect to the sliding sleeves, thereby facilitating the storage and transferring operation.

Therefore, the telescopic tube of the present invention modifies the current single-piece tube to a telescopic structure that is constituted of an upper section tube, a lower section tube and connecting rods. As a result, the total length of the tube is the sum of the lengths of the upper section tube, the lower section tube and the connecting rod therebetween. The distance of extending or retracting the upper section tube with respect to the lower section tube is the length of each connecting rod. That is to say, the minimum limit can reduce one third of the total length of the tube, and the maximum limit can reduce almost one half of the total length of the tube, thereby reducing the accommodating space and weight of the tube efficiently and decreasing the difficulty in transferring operation.

The number of the connecting rods can be plural, preferably three. In order to prevent the connecting rods between the upper and lower section tubes are twisted due to a larger external force to affect the effect of observation, the connecting rods may have a construction of larger rigidness and non-circular section. Further, the sliding sleeve which is fixed on the tube correspondingly to allow the connecting rod to penetrate through is also arranged to mate with the shape of the connecting rod. The way of fixing the connecting rod is preferably achieved by fixing it on the upper section tube, that is, one end of the connecting rod is fixed to the outer edge of the upper section tube. After being slidably inserted into the sliding sleeve provided on the outer edge of the lower section tube, the other end of the connecting rod is provided with a stopping block. In this way, when the upper section tube and the connecting rod are drawn together outwardly, the stopping block can prevent the connecting rod from separating from the lower section tube. The length of the upper section tube and the length of the lower section tube can be adjusted according to the actual length of the tube of the telescope, thereby realizing a reasonable length of the tube after retraction and thus facilitating the storage and transferring operation. For a tube of a larger length, if it is necessary to extend or retract to the maximum limit, the length of the upper section tube can be reduced as much as possible, thereby satisfying the mounting conditions of the eyepiece and the reflecting mirror. Preferably, the length of the lower section mates with the length of the connecting rod. In this way, not only the distance to which the tube can be extended and retracted is maximized, but also the connecting rod can be prevented from extending outside the wall of the lower section tube after the retraction of the tube if the length of the connecting rod is larger than that of the lower section tube. As a result, there is a possibility that the space of the tube cannot be reduced to a reasonable degree.

In the best structure, the length of the lower section tube is larger than that of the upper section tube, and the length of the connecting rod is slightly smaller than or identical to that of the lower section tube. On one hand, the lower section tube has to be fixed on the support, and on the other hand, such a structure can facilitate the extracting or retracting operation.

For the Newtonian reflector of a fixed focal distance, the length of tube is fixed. Therefore, when in use, the extension length of the connecting rod should be constant. Therefore, the maximum extension length of the connecting rod can be designed as the extension length necessary for the tube. Then, the locking means provided on the sliding sleeve is used to lock the connecting rod. The locking means can be a bolt. The bolt can be screwed forwardly to abut the connecting rod so as to be fixed with respect to the sliding sleeve, thereby locking the length of the tube. More preferably, the elastic positioning pin provided on the sliding sleeve or outside the connecting rod can be used, and the position of the elastic positioning pin is constant. The elastic telescopic head thereof is ejected and inserted into the positioning trough. At this time, the locking means can be used to position the connecting rod, so that the connecting rod can be fixed accurately and conveniently.

The axial retraction of the upper section tube with respect to the lower section tube can reduce the distance therebetween. At this time, the connecting surfaces thereof are connected with each other tightly, thereby preventing dust from entering the tube to affect the cleanness of the objective lens during the storage and transferring operation.

The present invention has advantageous effects as follows. The telescopic tube is designed reasonably. Not only the length of the Newtonian reflector can be reduced effectively for facilitating the storage and transferring operation, but also the weight of the tube can be reduced. The range of extension or retraction can achieve 30% to 40% of the total length of the tube. The operation for extending and retracting the telescopic tube can be performed simply and rapidly, so that it can be applied to various kinds of lenses of the Newtonian reflector to enhance the convenience in carrying and transferring operation.

According to the above, the present invention already achieves the desired objects and solves the drawbacks of prior art. Further, the present invention really has novelty and inventive steps. Therefore, the present invention conforms to the requirements for an invention patent.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A telescopic tube, comprising:
  an upper section tube;
  a lower section tube provided coaxially with the upper section tube;
  a support, the lower section tube being mounted on the support; and
  a plurality of connecting rods provided in parallel to an axis of the upper and lower section tubes, a first end of each connecting rod being fixed to the upper section tube, a second end opposite to the first end of each connecting rod being slidably connected to the lower section tube, the upper section tube and the connecting rods being able to move collectively between a first position with the upper section tube being located away from the lower section tube and a second position with the upper section tube being located close to the lower section tube, wherein an outside of the upper section tube is provided with an eyepiece, and the upper section tube is provided therein with a reflecting mirror.

2. A telescopic tube according to claim 1 wherein the lower section tube comprises a plurality of sliding sleeves for allowing the plurality of connecting rods to respectively pass therethrough and to slide therein in the direction of the axis, and wherein, for each corresponding connecting rod and sliding sleeve, the second end of the connecting rod penetrates through the sliding sleeve to be located on a side of the sliding sleeve opposite the first end of the connecting rod.

3. A telescopic tube according to claim 2 wherein each sliding sleeve comprises a locking mechanism which comprises a bolt that penetrates into a screw hole provided on the sliding sleeve and mates with the screw hole, wherein one end of the bolt abuts against the connecting rod in the sliding sleeve, and the other end of the bolt comprises a handgrip.

4. A telescopic tube according to claim 2 wherein each sliding sleeve comprises an elastic positioning pin comprising an elastic telescopic head which extends to the sliding sleeve and is slidably connected to the connecting rod, the connecting rod comprises positioning troughs for mating with the elastic telescopic head, and the elastic telescopic head is inserted into one of the positioning troughs to position the connecting rod when the connecting rod extends to a certain position.

5. A telescopic tube according to claim 2 wherein, for each connecting rod, the second end of the connecting rod comprises a stopping block having a cross-sectional dimension greater than a cross-sectional dimension of a bore of its corresponding sliding sleeve, thereby preventing the second end of the connecting rod from being drawn through the sliding sleeve and maintaining the second end of the connector rod on a side opposite that of the first end of the connecting rod.

6. A telescopic tube according to claim 1 wherein: a number of the connecting rods is 3 to 5; the connecting rods are uniformly or symmetrically distributed around an outer wall of the upper and lower section tubes; a length of each connecting rod is less than or equal to that of the lower section tube; and a length of the lower section tube is greater than that of the upper section tube.

7. A telescopic tube according to claim 1 wherein the upper section tube and the lower section tube comprise connecting surfaces that are matable with each other to form a tight seal when the upper section tube and the lower section tube are slidably moved into contact with one another.

8. A telescopic tube, comprising:
an upper section tube;
a lower section tube provided coaxially with the upper section tube;
a support, the lower section tube being mounted on the support; and
a plurality of connecting rods provided in parallel to an axis of the upper and lower section tubes, a first end of each connecting rod being fixed to the upper section tube, a second end opposite to the first end of each connecting rod being slidably connected to the lower section tube, the upper section tube and the connecting rods being able to move collectively between a first position with the upper section tube being located away from the lower section tube and a second position with the upper section tube being located close to the lower section tube, wherein a bottom inside the lower section tube is provided with an objective lens.

9. A telescopic tube according to claim 8 wherein the lower section tube comprises a plurality of sliding sleeves for allowing the plurality of connecting rods to respectively pass therethrough and to slide therein in the direction of the axis, and wherein, for each corresponding connecting rod and sliding sleeve, the second end of the connecting rod penetrates through the sliding sleeve to be located on a side of the sliding sleeve opposite the first end of the connecting rod.

10. A telescopic tube according to claim 9 wherein each sliding sleeve comprises a locking mechanism which comprises a bolt that penetrates into a screw hole provided on the sliding sleeve and mates with the screw hole, wherein one end of the bolt abuts against the connecting rod in the sliding sleeve, and the other end of the bolt comprises a handgrip.

11. A telescopic tube according to claim 9 wherein each sliding sleeve comprises an elastic positioning pin comprising an elastic telescopic head which extends to the sliding sleeve and is slidably connected to the connecting rod, the connecting rod comprises positioning troughs for mating with the elastic telescopic head, and the elastic telescopic head is inserted into one of the positioning troughs to position the connecting rod when the connecting rod extends to a certain position.

12. A telescopic tube according to claim 9 wherein, for each connecting rod, the second end of the connecting rod comprises a stopping block having a cross-sectional dimension greater than a cross-sectional dimension of a bore of its corresponding sliding sleeve, thereby preventing the second end of the connecting rod from being drawn through the sliding sleeve and maintaining the second end of the connector rod on a side opposite that of the first end of the connecting rod.

13. A telescopic tube according to claim 8 wherein: a number of the connecting rods is 3 to 5; the connecting rods are uniformly or symmetrically distributed around an outer wall of the upper and lower section tubes; a length of each connecting rod is less than or equal to that of the lower section tube; and a length of the lower section tube is greater than that of the upper section tube.

14. A telescopic tube according to claim 8 wherein the upper section tube and the lower section tube comprise connecting surfaces that are matable with each other to form a tight seal when the upper section tube and the lower section tube are slidably moved into contact with one another.

15. A telescopic tube, comprising:
an upper section tube, an interior of the upper section tube comprising an upper portion of an optical path of the telescopic tube;
a lower section tube aligned coaxially with the upper section tube along a tube axis, an interior of the lower section tube comprising a lower portion of the optical path of the telescopic tube; and
a plurality of connecting rods extending generally parallel to the tube axis between the upper and lower section tubes, each connecting rod comprising a first end fixed to one of the upper and lower section tubes and a second end opposite to the first end, each connecting rod slidably connected to a corresponding sliding sleeve on the other one of the upper and lower section tubes, such that slidable motion of the connecting rods through the sliding sleeves permits relative movement of the upper and lower section tubes along the tube axis between: a first position where the upper and lower section tubes are spaced apart from one another by a first space and wherein the upper section tube, the lower section tube and the connecting rods have a first total combined length along the axis; and a second position where the upper and lower section tubes are closer together than the first space and wherein the upper section tube, the lower section tube and the connecting rods have a second total combined length along the axis that is less than the first total combined length;
wherein each connecting rod slidably penetrates through its corresponding sliding sleeve such that the second end of the connecting rod is located on a side of the corresponding sliding sleeve opposite that of the first end of the connecting rod, and
wherein the interior of the upper section tube comprises a reflecting mirror for directing light in a direction generally transverse with the axis.

16. A telescopic tube according to claim 15 wherein for each connecting rod, the first end is fixed to the upper section tube and the connecting rod is slidably connected to its corresponding sliding sleeve, the corresponding sliding sleeve located on the lower section tube.

17. A telescopic tube according to claim 15 wherein each sliding sleeve comprises a locking mechanism which comprises a bolt that penetrates into a screw hole provided on the sliding sleeve and mates with the screw hole, wherein one end of the bolt abuts against the connecting rod in the sliding sleeve, and the other end of the bolt comprises a handgrip.

18. A telescopic tube according to claim 15 wherein each sliding sleeve comprises an elastic positioning pin comprising an elastic telescopic head which extends to the sliding sleeve and is slidably connected to the connecting rod, the connecting rod comprises positioning troughs for mating with the elastic telescopic head, and the elastic telescopic head is inserted into one of the positioning troughs to position the connecting rod when the connecting rod extends to a certain position.

19. A telescopic tube according to claim 15 wherein, for each connecting rod, the second end of the connecting rod comprises a stopping block having a cross-sectional dimension greater than a cross-sectional dimension of a bore of its corresponding sliding sleeve, thereby preventing the second end of the connecting rod from being drawn through the sliding sleeve and maintaining the second end of the connector rod on a side opposite that of the first end of the connecting rod.

20. A telescopic tube according to claim 15 wherein: a number of the connecting rods is 3 to 5; the connecting rods are uniformly or symmetrically distributed around an outer wall of the upper and lower section tubes; a length of each connecting rod is less than or equal to that of the lower section tube; and a length of the lower section tube is greater than that of the upper section tube.

21. A telescopic tube according to claim 15 wherein the upper section tube and the lower section tube comprise connecting surfaces that are matable with each other to form a tight seal when the upper section tube and the lower section tube are slidably moved into contact with one another.

22. A telescopic tube according to claim 15 wherein the first total combined length corresponds to a focal length of the telescopic tube.

23. A telescopic tube, comprising:
an upper section tube, an interior of the upper section tube comprising an upper portion of an optical path of the telescopic tube;
a lower section tube aligned coaxially with the upper section tube along a tube axis, an interior of the lower section tube comprising a lower portion of the optical path of the telescopic tube; and
a plurality of connecting rods extending generally parallel to the tube axis between the upper and lower section tubes, each connecting rod comprising a first end fixed to one of the upper and lower section tubes and a second end opposite to the first end, each connecting rod slidably connected to a corresponding sliding sleeve on the other one of the upper and lower section tubes, such that slidable motion of the connecting rods through the sliding sleeves permits relative movement of the upper and lower section tubes along the tube axis between: a first position where the upper and lower section tubes are spaced apart from one another by a first space and wherein the upper section tube, the lower section tube and the connecting rods have a first total combined length along the axis; and a second position where the upper and lower section tubes are closer together than the first space and wherein the upper section tube, the lower section tube and the connecting rods have a second total combined length along the axis that is less than the first total combined length;
wherein each connecting rod slidably penetrates through its corresponding sliding sleeve such that the second end of the connecting rod is located on a side of the corresponding sliding sleeve opposite that of the first end of the connecting rod, and
wherein an outside of the upper section tube comprises an eyepiece.

24. A telescopic tube according to claim 23 wherein for each connecting rod, the first end is fixed to the upper section tube and the connecting rod is slidably connected to its corresponding sliding sleeve, the corresponding sliding sleeve located on the lower section tube.

25. A telescopic tube according to claim 23 wherein each sliding sleeve comprises a locking mechanism which comprises a bolt that penetrates into a screw hole provided on the sliding sleeve and mates with the screw hole, wherein one end of the bolt abuts against the connecting rod in the sliding sleeve, and the other end of the bolt comprises a handgrip.

26. A telescopic tube according to claim 23 wherein each sliding sleeve comprises an elastic positioning pin comprising an elastic telescopic head which extends to the sliding sleeve and is slidably connected to the connecting rod, the connecting rod comprises positioning troughs for mating with the elastic telescopic head, and the elastic telescopic head is inserted into one of the positioning troughs to position the connecting rod when the connecting rod extends to a certain position.

27. A telescopic tube according to claim 23 wherein, for each connecting rod, the second end of the connecting rod comprises a stopping block having a cross-sectional dimension greater than a cross-sectional dimension of a bore of its corresponding sliding sleeve, thereby preventing the second end of the connecting rod from being drawn through the sliding sleeve and maintaining the second end of the connector rod on a side opposite that of the first end of the connecting rod.

28. A telescopic tube according to claim 23 wherein: a number of the connecting rods is 3 to 5; the connecting rods are uniformly or symmetrically distributed around an outer wall of the upper and lower section tubes; a length of each connecting rod is less than or equal to that of the lower section tube; and a length of the lower section tube is greater than that of the upper section tube.

29. A telescopic tube according to claim 23 wherein the upper section tube and the lower section tube comprise connecting surfaces that are matable with each other to form a tight seal when the upper section tube and the lower section tube are slidably moved into contact with one another.

30. A telescopic tube according to claim 23 wherein the first total combined length corresponds to a focal length of the telescopic tube.

31. A telescopic tube, comprising:
an upper section tube, an interior of the upper section tube comprising an upper portion of an optical path of the telescopic tube;
a lower section tube aligned coaxially with the upper section tube along a tube axis, an interior of the lower section tube comprising a lower portion of the optical path of the telescopic tube; and
a plurality of connecting rods extending generally parallel to the tube axis between the upper and lower section tubes, each connecting rod comprising a first end fixed to one of the upper and lower section tubes and a second end opposite to the first end, each connecting rod slidably connected to a corresponding sliding sleeve on the other one of the upper and lower section tubes, such that slidable motion of the connecting rods through the sliding sleeves permits relative movement of the upper and lower section tubes along the tube axis between: a first position where the upper and lower section tubes are spaced apart from one another by a first space and wherein the upper section tube, the lower section tube and the connecting rods have a first total combined length along the axis; and
a second position where the upper and lower section tubes are closer together than the first space and wherein the upper section tube, the lower section tube and the connecting rods have a second total combined length along the axis that is less than the first total combined length;
wherein each connecting rod slidably penetrates through its corresponding sliding sleeve such that the second end of the connecting rod is located on a side of the corresponding sliding sleeve opposite that of the first end of the connecting rod, and wherein the interior of the lower section tube comprises an objective lens.

32. A telescopic tube according to claim 31 wherein for each connecting rod, the first end is fixed to the upper section tube and the connecting rod is slidably connected to its corresponding sliding sleeve, the corresponding sliding sleeve located on the lower section tube.

33. A telescopic tube according to claim 31 wherein each sliding sleeve comprises a locking mechanism which comprises a bolt that penetrates into a screw hole provided on the sliding sleeve and mates with the screw hole, wherein one end of the bolt abuts against the connecting rod in the sliding sleeve, and the other end of the bolt comprises a handgrip.

34. A telescopic tube according to claim 31 wherein each sliding sleeve comprises an elastic positioning pin comprising an elastic telescopic head which extends to the sliding sleeve and is slidably connected to the connecting rod, the connecting rod comprises positioning troughs for mating with the elastic telescopic head, and the elastic telescopic head is inserted into one of the positioning troughs to position the connecting rod when the connecting rod extends to a certain position.

35. A telescopic tube according to claim 31 wherein, for each connecting rod, the second end of the connecting rod comprises a stopping block having a cross-sectional dimension greater than a cross-sectional dimension of a bore of its corresponding sliding sleeve, thereby preventing the second end of the connecting rod from being drawn through the sliding sleeve and maintaining the second end of the connector rod on a side opposite that of the first end of the connecting rod.

36. A telescopic tube according to claim 31 wherein: a number of the connecting rods is 3 to 5; the connecting rods are uniformly or symmetrically distributed around an outer wall of the upper and lower section tubes; a length of each connecting rod is less than or equal to that of the lower section tube; and a length of the lower section tube is greater than that of the upper section tube.

37. A telescopic tube according to claim 31 wherein the upper section tube and the lower section tube comprise connecting surfaces that are matable with each other to form a tight seal when the upper section tube and the lower section tube are slidably moved into contact with one another.

38. A telescopic tube according to claim 31 wherein the first total combined length corresponds to a focal length of the telescopic tube.

* * * * *